United States Patent [19]

Hanks

[11] Patent Number: 5,299,075
[45] Date of Patent: Mar. 29, 1994

[54] APPARATUS AND METHOD FOR SHOCK ATTENUATION IN A DISK RECORDING AND/OR REPRODUCTION SYSTEM USING VARIABLE GAIN ACCELERATION SENSOR

[75] Inventor: D. Mitchel Hanks, Boise, Id.

[73] Assignee: Hewlett-Packard Company, Palo Alto, Calif.

[21] Appl. No.: 893,303

[22] Filed: Jun. 4, 1992

[51] Int. Cl.$^5$ .............................................. G11B 21/10
[52] U.S. Cl. .................................. 360/77.02; 360/75; 360/77.07
[58] Field of Search ............... 360/77.02, 75; 324/212, 324/207.12; 242/225; 318/638, 651; 73/493, 660

[56] References Cited

U.S. PATENT DOCUMENTS

| | | | |
|---|---|---|---|
| 4,068,302 | 1/1978 | Olmstead | 364/200 |
| 4,494,159 | 1/1985 | Takayama | 360/78 |
| 4,764,860 | 8/1988 | Takao | 369/43 |
| 4,967,293 | 10/1990 | Aruga et al. | 360/78.12 |

FOREIGN PATENT DOCUMENTS

264535 4/1988 European Pat. Off. .
60-35377 2/1985 Japan .

Primary Examiner—Aristotelis Psitos
Assistant Examiner—James L. Habermehl
Attorney, Agent, or Firm—E. F. Oberheim

[57] ABSTRACT

A disk recording and/or reproduction device subject to acceleration forces in which the transducer track following function is augmented by an acceleration responsive transducer positioning control. The acceleration response is calibrated as a function of the position error of the transducer with respect to the center of the track being followed.

16 Claims, 5 Drawing Sheets

POSITION OF HEAD RELATIVE TO DISK

TIME

FIG. 6

APPARATUS AND METHOD FOR SHOCK ATTENUATION IN A DISK RECORDING AND/OR REPRODUCTION SYSTEM USING VARIABLE GAIN ACCELERATION SENSOR

TECHNICAL FIELD

This invention relates generally to shock attenuation controls in disk recording and/or reproduction systems and more particularly to apparatus and methods for calibrating such shock attenuation controls.

BACKGROUND OF THE INVENTION

In a disk recording and/or reproduction system an objective of the servo system which controls the radial position of the transducer on the disk, is to keep the transducer over the center of a preselected track. In a disk file system, this is done as the transducer reads position information from a track in the surface of the disk as the disks rotates. This position information is then used to develop a position error signal. The error signal is then fed back through a compensator into the drive motor for the transducer actuator to move the transducer in a direction to reduce the error.

The servo system includes a feed back servo loop. The position error signal is coupled into the feed back loop. Because of the finite response time of the feed back servo loop in correcting for disturbances, these disturbances or displacements cannot be totally eliminated. In the prior art, to aid the servo system in holding the transducer on track center in the presence of a physical disturbance or displacement, such as a shock force, an accelerometer has been found to be useful. An accelerometer mounted on the base plate of the disk file or compact disk player senses the resulting acceleration. Such acceleration will cause the disk to move relative to the transducer, resulting in an off track excursion of the transducer. The signal from the accelerometer is coupled to the actuator drive motor to cause a force to be applied to the transducer which, ideally, moves the transducer with the disk in the direction of the displacement, resulting in no net displacement of the transducer with respect to the track. This system has been in use for several years.

Typical prior art systems are found in U.S. Pat. Nos. 4,040,103; 4,138,121; 4,325,089; 4,532,802; 4,562,562; 4,573,087; 4,692,915; 4,862,298 and 4,947,093.

These patents are briefly reviewed below.

U.S. Pat. No. 4,040,103 describes a shock force compensating system in which, an accelerometer senses shock forces acting perpendicular to the gap between the head and the disk. Disturbance between the head and disk lags the shock by about one to ten milliseconds. Acceleration sensing is employed to provide lead time to minimize displacement.

U.S. Pat. No. 4,138,121 describes a control for a tone arm assembly in a record player. High fidelity reproduction is said to be obtained by employing a detector for detecting low and high frequencies in horizontal and vertical directions and using such detection to develop a signal which is fed back to cancel the vibrations.

U.S. Pat. No. 4,325,089 employs vibration sensing in an effort to safeguard magnetically recorded data. In this disclosure, unauthorized access to data is minimized by detectors which destroy the disk data by causing it to be passed through an electromagnetic field which erases the data. One detector of the plurality of detectors which are employed, is responsive to vibration caused by attempted physical access to the disk.

U.S. Pat. No. 4,532,802 employs accelerometers in a system for analyzing the interface between a recording disk and a read/write head. In one of its aspects, this system employs two accelerometers which ride piggy back on the transducer. One accelerometer is positioned at the leading edge of the transducer body and the other accelerometer is positioned at the trailing edge of the transducer body. These accelerometers are of the piezoelectric type. In their respective positions, these accelerometers sense vertical accelerations of the transducers and produce signals which when processed produce traces of the excursions including head crashes.

U.S. Pat. No. 4,562,562 describes a tracking system for controlling the radial position of a transducer on a disk in a disk file or drive. In the disclosed arrangement, a circuit is provided which detects the acceleration of the transducer in the rough searching or seek mode of the system. A signal developed by this acceleration detection circuit is applied to the actuator which positions the transducer or tracking element and powers the actuator in a direction so that the transducer error is substantially zero.

U.S. Pat. No. 4,573,087 describes a recording apparatus involving an electromagnetic device which senses a vibration of the recording head. When the recording head is stabilized a signal is produced which enables recording.

U.S. Pat. No. 4,692,915 describes a recording and reproduction apparatus employing a system in which sensitivity to acceleration is minimized. This is accomplished by providing three different accelerometers which respectively sense accelerations perpendicular to the recording tracks, accelerations perpendicular to the disk surface and accelerations parallel to the track direction. Excesses of acceleration sensed by an abnormality detector suspends transducing.

U.S. Pat. No. 4,862,298 describes a shock load detection device for a disk drive. Here there is described a cluster of piezoelectric sensors which sense accelerations in x, y and z directions, these being mutually perpendicular axes. The signals produced by these respective piezoelectric sensors are compared to threshold signals for the respective axes. When the acceleration signals exceed the threshold signals, reading or writing is interrupted.

U.S. Pat. No. 4,947,093 describes a shock resistant control system for a Winchester type of disk drive. Here, it is observed, that angular acceleration having a torque component acting about the axis of the disk stack causes circumferential shift of the tracks on the disk drive with respect to a transducer. This results in frequency modulation which is sensed. A phase comparator responsive to this modulation, controls the frequency of a voltage controlled oscillator in the system which shifts the phase to accommodate the frequency modulation which has taken place. In a rotary actuator drive of the type described, the transducer may also shift from track center as a result of the angular acceleration. This produces a position error signal which is coupled into the servo loop which controls the transducer.

The phase comparison signal is also, after filtering, coupled into the servo loop and functions to augment the positioning of the transducer by the servo. It is noted that acceleration sensing is not a feature of this particular disclosure.

One problem encountered in the implementation of prior art systems employing accelerometers of the type referenced above, is that it is expensive to obtain and maintain the necessary calibration of the accelerometer signal. Typically, low cost accelerometers like those economically feasible to this application, as manufactured, do not exhibit the same acceleration response and temperature response. Thus the signal gains at the source vary widely among the accelerometers. Augmenting this undesirable condition is the fact that other sources of signal gain in the signal path of the accelerometer to the head are subject to gain variation as well.

A second problem encountered in the manufacture and use of prior art systems of the type described, lies in testing the performance of the accelerometer in the servo system. It is expensive and impractical in high volume manufacture to perform an external shock or vibration test to evaluate the function (goodness) of the accelerometer shock corrective loop. Such a test requires a large mechanical shaker or other means for imparting external acceleration disturbances to the disk drive for the disk player for each test station.

There remains a need for a system in which accelerometers of different gain may be employed in disk recording and reproduction systems to function acceptably in the environment of use without the need for matched selection and extensive test and calibration of an assembled system.

SUMMARY OF THE INVENTION

A system and a method, according to this invention, provides for the calibration or tuning of the sensitivity of the accelerometer in the system while the system is in use to maximize compensation for the effect of physical disturbances on the relative position between the transducer and the disk, thus alleviating the need for precision accelerometers, precision signal paths in the servo system, and expensive test equipment.

This invention is applicable in any disk recording and or reproduction device, such as disk files or drives and disk players. It is particularly useful where portability is essential to equipment. Portability presents a mechanically abusive environment for such devices.

To minimize malfunction due to acceleration resulting from shock forces acting on the device, an accelerometer is employed to sense the acceleration. All such devices comprise a control system for positioning a transducer relative to a recorded track on the surface of a disk. A track position error signal, originating at the transducer is used by the control system to move the transducer in the direction of track center.

An accelerometer is mounted on the device to sense acceleration of the device, angular (rotary) or linear, which has a component acting in a direction to displace a transducer from track center. The accelerometer output is coupled into the control system in a sense to oppose the acceleration force acting on the transducer. Accelerometers and other active and passive electrical and electronic devices in such control systems, while manufactured to reasonable tolerances, exhibit unacceptable variations in gain from one part to another for the present application. Thus the simple coupling of an uncalibrated accelerometer signal into the control system is only a partially satisfactory approach to solving the problem of compensating acceleration induced errors.

This invention provides a system for calibrating the response of the accelerometer, while the record and/or reproduction device is in use, as a function of the transducer/track position error. The accelerometer output is coupled as input to a variable gain amplifier and the amplifier gain is controlled by the position error signal. Acceleration is the second derivative of displacement and exists prior to velocity or the onset of displacement. As such the use of an acceleration derived signal in the control system, calibrated as a function of a transducer position error signal, provides lead time to develop a track centering force acting on the transducer to minimize unacceptable offtrack operation. Since the acceleration derived signal is coupled into the control system which positions the transducer and is further calibrated as a function of the position error signal, the gain control function not only calibrates the gain of the accelerometer but calibrates the accelerometer gain for the gain of the servo control system as well.

BRIEF DESCRIPTION OF THE DRAWINGS

The invention will be better understood by reference to the following specification when considered in conjunction with the accompanying drawings in which.

BEST MODE FOR PRACTICING THE INVENTION

Figure 1:
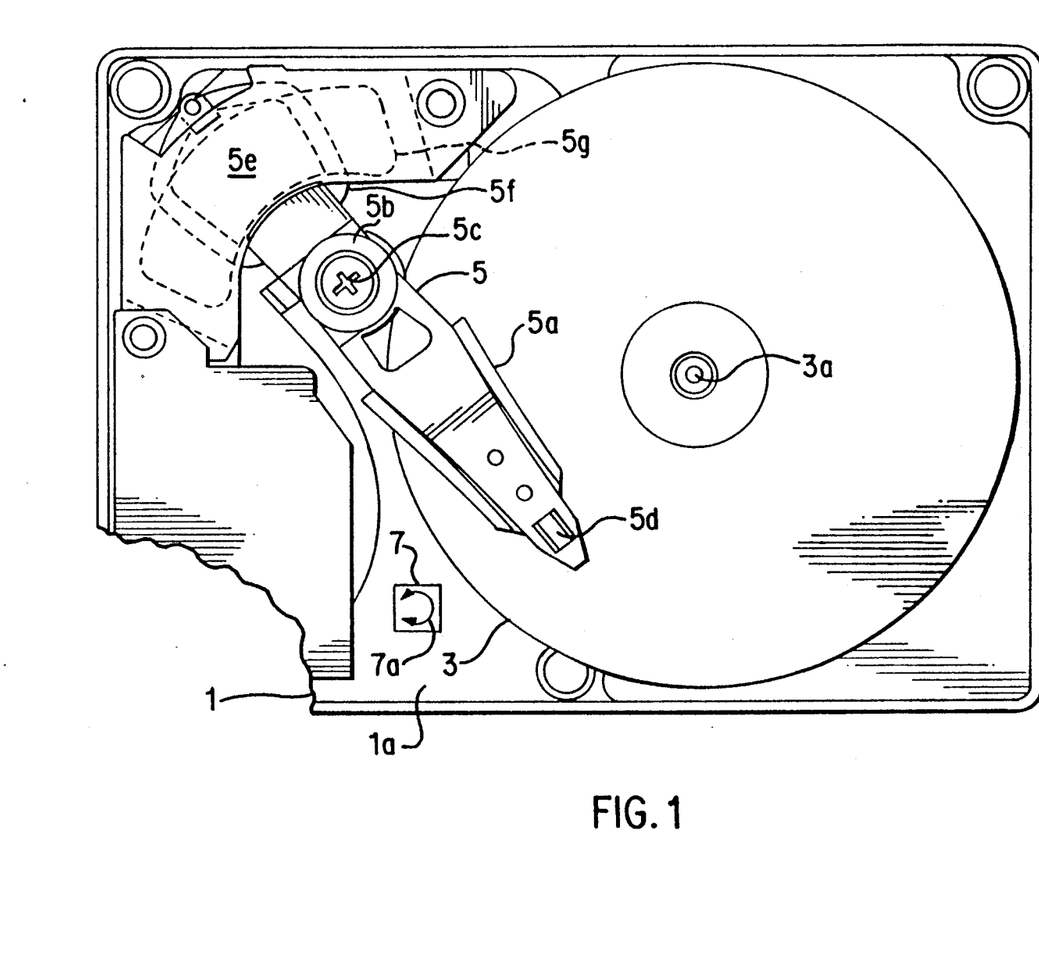
FIG. 1 is a plan view of a rotary actuator type of disk drive illustrating the location of a rotary accelerometer in the disk drive.
Figure 2:
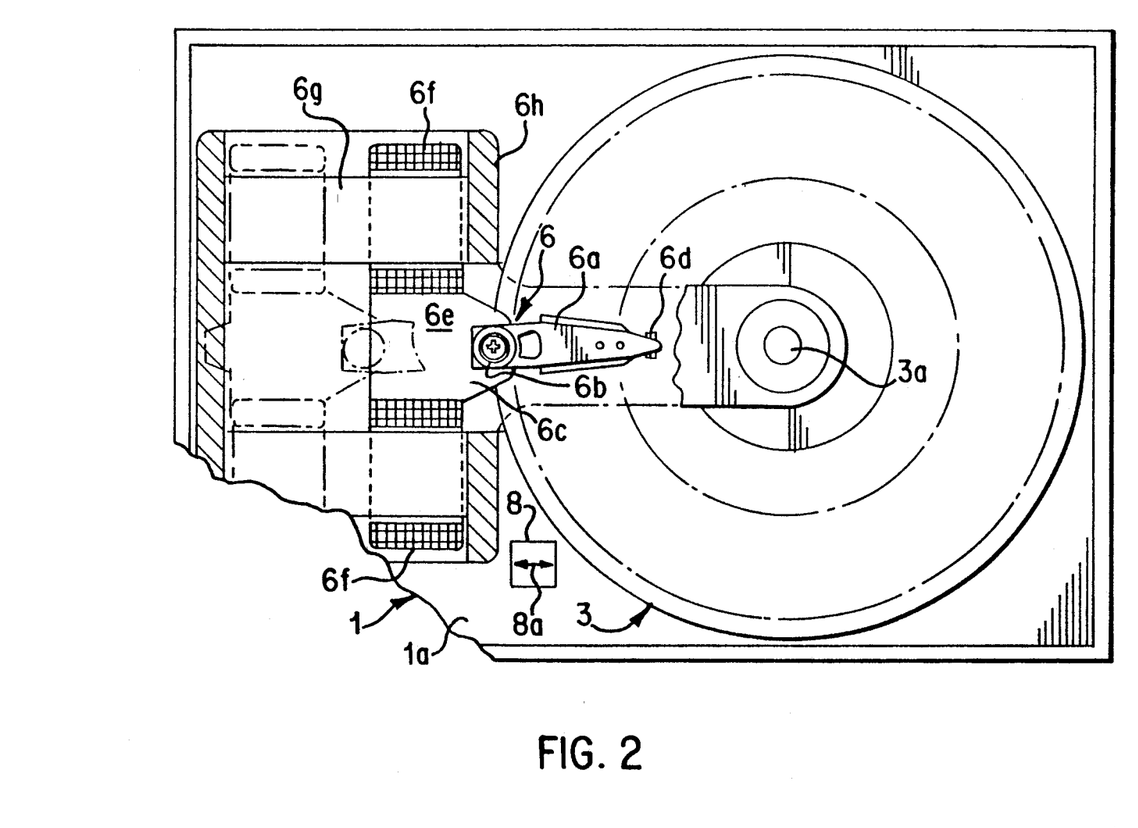
FIG. 2 is a plan view of a linear actuator type of disk drive illustrating the location of a linear accelerometer in the disk drive.

FIGS. 1 and 2 are plan views of disk drives embodying the principles of this invention. FIG. 1 is a rotary actuator type of disk drive and FIG. 2 is a linear actuator type of disk drive. The application of this invention to disk players and other types of disk recording and reproduction devices is apparent from these drives.

In FIGS. 1 and 2, the disk drives each comprise a housing 1 having a base or support 1a upon which a disk stack 3 is mounted for rotation about an axis 3a.

Referring particularly to FIG. 1, a rotary actuator 5 comprises a load beam arm stack 5a secured to a bearing housing 5b journaled on the support 1a to rotate about an axis 5c. Each load beam carries at its distal end a transducer 5d. The rotary actuator 5 further comprises a voice coil drive motor 5e. The voice coil drive motor 5e is secured to the bearing housing 5b and comprises a coil 5f disposed in flux linkage with a permanent magnet structure 5g. In operation, as is well known, provision is made for the bi-directional energization of the voice coil 5f at which time, depending upon the polarity of excitation of the coil, the coil will swing in an arc about the axis 5c, between the magnets of the permanent magnet structure 5g. The transducer 5d, commonly a magnetic head, is positioned at selected radial positions with respect to the disk in seeking and following tracks on the disk, following a shallow arced path, having as its center the axis 5c of the actuator 5.

This rotatory actuator 5 is balanced about the axis 5c and thus is relatively insensitive, if not completely insensitive, to linear forces having force components normal to the axis 5c, but because of its angular moment of inertia about the axis 5c, is sensitive to torque couples acting about the axis 5c.

For the purpose of sensing angular acceleration of the rotary actuator and for providing signals as a function of the sensed acceleration, useful in controlling the rotary actuator 5 to minimize its angular displacement, a rotary accelerometer assembly 7 is secured to the housing 1, here shown as being secured to the base or support 1a of the housing, in a position to sense angular acceleration of the recording device having a component acting about the axis 5c of the bearing housing 5b. The rotary accelerometer assembly 7 may be disposed anywhere on the housing 1. Preferably such disposition is within the housing 1 in a position in which its axis parallels the axis 5c of the bearing housing 5b. Angular acceleration of the recording device will be understood to be the result of any force applied to the housing which results in angular displacement of the housing. As seen in FIG. 1, the double ended arrow 7a of the rotary actuary assembly indicates accelerometer sensitivity to acceleration about any axis normal to the plane of the support or base 1a, which axis parallels the axis 5c of the rotary actuator. From this, it is apparent that the rotary accelerometer assembly may be disposed at any convenient location within the housing whereat its axis of sensitivity parallels the axis 5c of the rotary actuator 5. It is not necessary that the axis of sensitivity of the rotary actuator assembly 7 be coincident with the axis 5c.

Referring now to FIG. 2, the linear actuator 6 comprises a load beam stack 6a. The distal end of each load beam 6a carries a magnetic head 6d. The mounting ends 6b of the load beams 6a are secured to the movable member 6c of a drive motor 6e. The movable member of the drive motor 6e carries coils 6f which are disposed in flux linkage with linear permanent magnets 6g. The linear permanent magnets 6g are supported by a stationery motor housing 6h which is secured to the base or support 1a. Such a linear motor is displaceable to any position between two position extremes, one indicated in solid outline and the other indicated in dot dash outline. The axis of this movement is directed along a radius perpendicular to the axis of rotation 3a of the disk stack 3.

In this arrangement, a linear accelerometer 8 is employed to sense bi-directional acceleration having a linear acceleration component acting in a direction parallel to the axis of stroke of the linear actuator. The linear direction of acceleration sensitivity, in this instance, is indicated by the bidirectional arrow 8a on the linear accelerometer 8. As in the case of the rotary accelerometer assembly, this linear accelerometer assembly may be positioned anywhere in the disk recording and reproduction device, preferably within the housing, with its sensitive axis paralleling the axis of stroke of the linear actuator 6. The sensitive axis of the linear accelerometer assembly need not be coincident with the axis of the linear actuator 6.

Accelerometers of various types may be employed for the purposes of this invention. As seen from the patents discussed in the background of this invention, piezoelectric types of accelerometers have been employed in such applications. As seen from U.S. Pat. No. 4,532,802 above, two piezoelectric transducers are employed to sense the movement of the opposite ends, the leading end and the trailing end of the transducer body. The angular acceleration of such a transducer body applies a compression load to one piezoelectric device and a tension load to the other piezoelectric device. The signal difference between these, therefore, is an indication of angular acceleration. Such a structure, it will be apparent, is applicable in connection with the rotary action type of disk recording or reproduction device.

Figure 3:
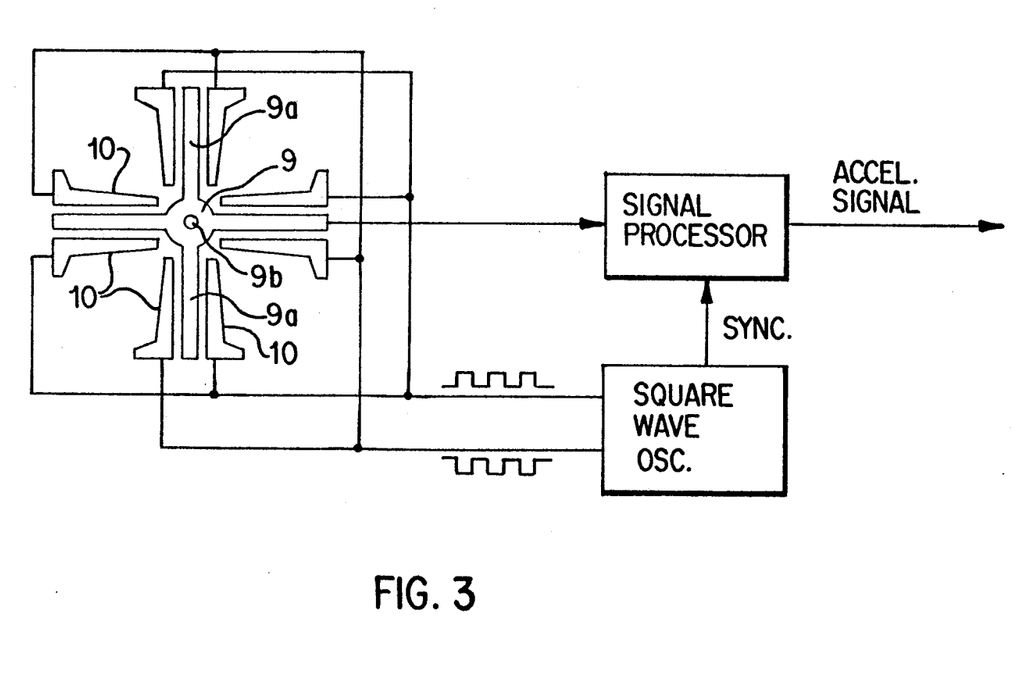
FIG. 3 schematically depicts a rotary type of accelerometer.

FIG. 3 illustrates still another type of device embodying the differing elementary physical principles. The rotary accelerometer assembly of FIG. 3 employs capacitive coupling. The electrode fingers 9a of a rotary electrode 9 and respective fixed electrodes 10, disposed in pairs on opposite sides of the finger electrodes 9a of the rotary electrode 9 are capacitively coupled. In such an arrangement, the rotary electrode 9 may be supported at its central hub section, leaving the electrode fingers 9a deflectable in their mass reaction response to angular acceleration about the axis 9b of the rotary electrode. Corresponding electrodes of the stationary electrode pairs are connected together and supplied with oppositely phased time varying electrical voltages, here depicted as oppositely phased squarewave voltages, whereby physical displacement in one angular direction or the other of the finger electrodes 9a, in their mass reaction response to angular acceleration about the axis 9b, results in an electrical output at the finger electrodes, in one predominate phase or the other, depending upon the direction of angular response, to produce an electrical output coupled from the rotary electrode to a signal processor synchronized with the squarewave voltages, from which an acceleration signal may be derived.

Piezoelectric and capacitive coupling do not represent all possible approaches to the development of an angular acceleration signal. Resistive, magneto resistive, and electromagnetic implementations of accelerometers may be employed.

Again, referring to U.S. Pat. No. 4,532,802, it will be seen that any single piezoelectric accelerometer as described therein may be used to detect linear acceleration. Similarly capacitive coupling techniques for detecting linear acceleration are easily implemented employing structure of the type of FIG. 3, using only a pair of diametrically disposed movable electrodes 9a. Further detail with respect to such a linear accelerometer assembly may be had by reference to ELECTRONIC DESIGN, dated Aug. 8, 1991, pages 45, 48, 49, 50, 51, 54 and 56, an article by Frank Goodenough, entitled "Airbags Boom When IC Accelerometer Sees 50G".

Figure 4:
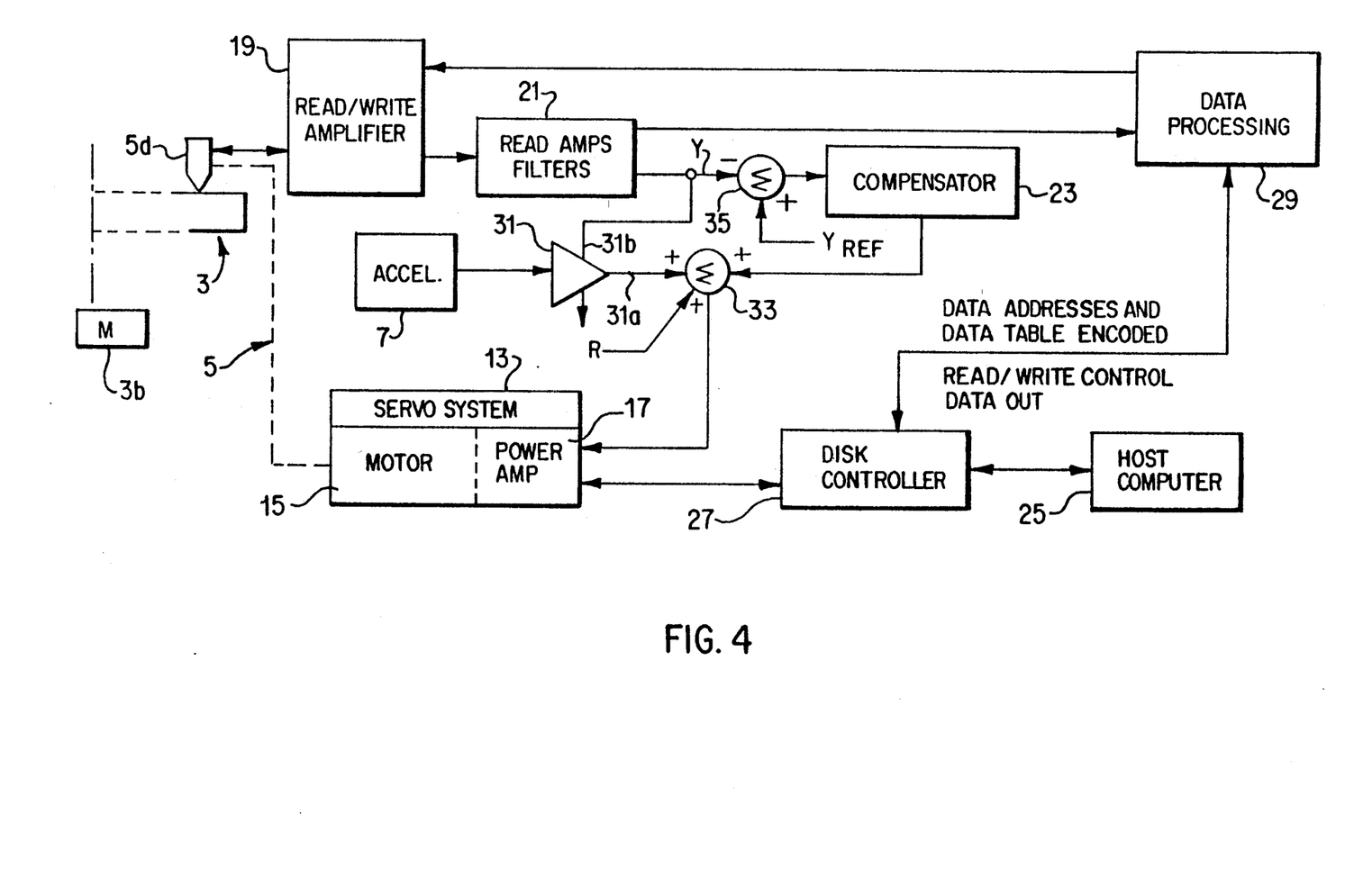
FIG. 4 diagrammatically illustrates a disk drive servo system embodying the principles of this invention.

A control system for practicing this invention is illustrated in FIG. 4. This system illustrates the presently known best mode for practicing this invention and in that respect is based upon a system of control for a disk drive. Using the disk drive of FIG. 1 as a typical example of such a control system, the system of FIG. 4 comprises a rotatably mounted disk stack 3 which is powered by a motor 3b to be driven at constant rpm. A transducer 5d is positioned by the movable actuator 5 at different radial locations over the adjacent surface of the disk of the disk stack 3 by means of a servo system 13. Such a servo system for the purposes of this description comprises a motor 15 which is powered by a power amplifier 17. The position of the magnetic head 5d, with respect to the center of a recorded track, is detected by the transducer 5d from servo code recorded in that track. As is well known, such servo code may be embedded or sampled servo in each track, or may be servo code on a dedicated servo disk surface. The servo motor 15 is part of a servo loop which includes the magnetic head 5d and conventionally includes a read/write amplifier 19, read amplifiers and filters 21, a compensator 23 and a power amplifier 17.

In that situation where a single head 5d transduces both embedded servo code and data in particular tracks, the system functions in the track following mode in servo code sectors and in the data reading mode in the data sectors. In such a system, requests for information by a host computer 25 are transformed by a disk controller 27 into track identity and track sector signals. In the presence of such requests, the system functions in the track seek mode of operation and radially positions the magnetic head 5d at the center of the selected track and reads the data when the selected sector in that data track passes beneath the magnetic head. To this end, the data processor 29, receiving data from the read amplifier 21, is bi-directionally coupled to the disk controller 20 so that data addresses, data to be encoded, data being read out, and read/write controls may be passed therebetween. Data which is read out is coupled by the disk controller 27 to the host computer 25 as the data which is requested by the host computer. Where data is to be written onto the disk, such data from the host computer is designated for track and sector location on the disk by the disk controller 27 and transmitted also to the data processor 29 to be coupled to the magnetic head 5d via read/write amplifier 19 when the magnetic head 5d is in the designated sector of the selected track.

In any disk recording and reproduction system, an objective of the servo system which controls the radial position of the transducer 5d on the disk 3, is to keep the transducer 5d over the pre-defined track center. In a disk file system such as that illustrated in FIG. 4, this is done as the transducer 5d reads position information from a track in the surface of the disk 3 as the disk rotates. This position information is then used to develop a position error signal. The error signal is then fed back through a compensator 23 into the actuator drive motor 15 to move the transducer 5d in a direction to reduce the error.

The system thus far described is conventional. As discussed in connection with FIGS. 1 and 2 acceleration of the disk recording and reproduction device from any source may result in mass reaction forces acting on the actuator structure which displace the transducer from a track centered position to thereby interfere with any writing or reading function which is taking place. Acceleration sensitivity and compensation is provided by the accelerometer 7 which is connected in the servo feed back loop. A summing junction 33 is connected between the compensator 23 and the power amplifier 17 of the servo system 13. The output of the accelerometer is coupled into a variable gain amplifier 31 the output of which on circuit 31a is coupled to the summing junction 33 as a feed forward signal in the servo feed back loop.

The position error signal Y from the magnetic head 5d is coupled to a variable gain control input circuit 31b on the variable gain amplifier to control its gain and, hence, to calibrate the accelerometer feed forward input in the servo feed back loop as a direct function of the magnitude of the position error signal. Thus variations in mass reaction response of the actuator and the accelerometer are compensated by using the off track signal to calibrate the servo loop to provide the required degree of servo response for the instant transducer displacement. A summing junction 35 is employed to compare the position error signal Y with a reference or threshold error voltage $Y_{REF}$ at the input to the compensator 23. The voltage $Y_{REF}$ represents the maximum acceptable position error.

Thus the feedback loop for the servo system during the track following mode of operation is responsive to the track position error signal and to the acceleration signal calibrated as a function of the position error, and all corrections are in a sense to reduce the magnetitude of the position error, to maintain the transducer essentially in a track centered position.

Thus provision is made herein for calibration of the acceleration signal to provide adequate control of the transducer to obviate unacceptable displacements. By utilizing the position error signal Y, developed at the output of the read amplifiers and filters 21, to control the gain of the variable gain amplifier 31 and thereby develop at the summing junction 33 a calibrated feed forward acceleration signal which is summed with the position error feedback signal, the gain variation for all elements in the servo loop is compensated, resulting in servo system control in that degree necessary to maintain the transducer 5d within acceptable limits of displacement from track center to the end that reading or writing at the disk may proceed without interruption.

Figures 5, 6:
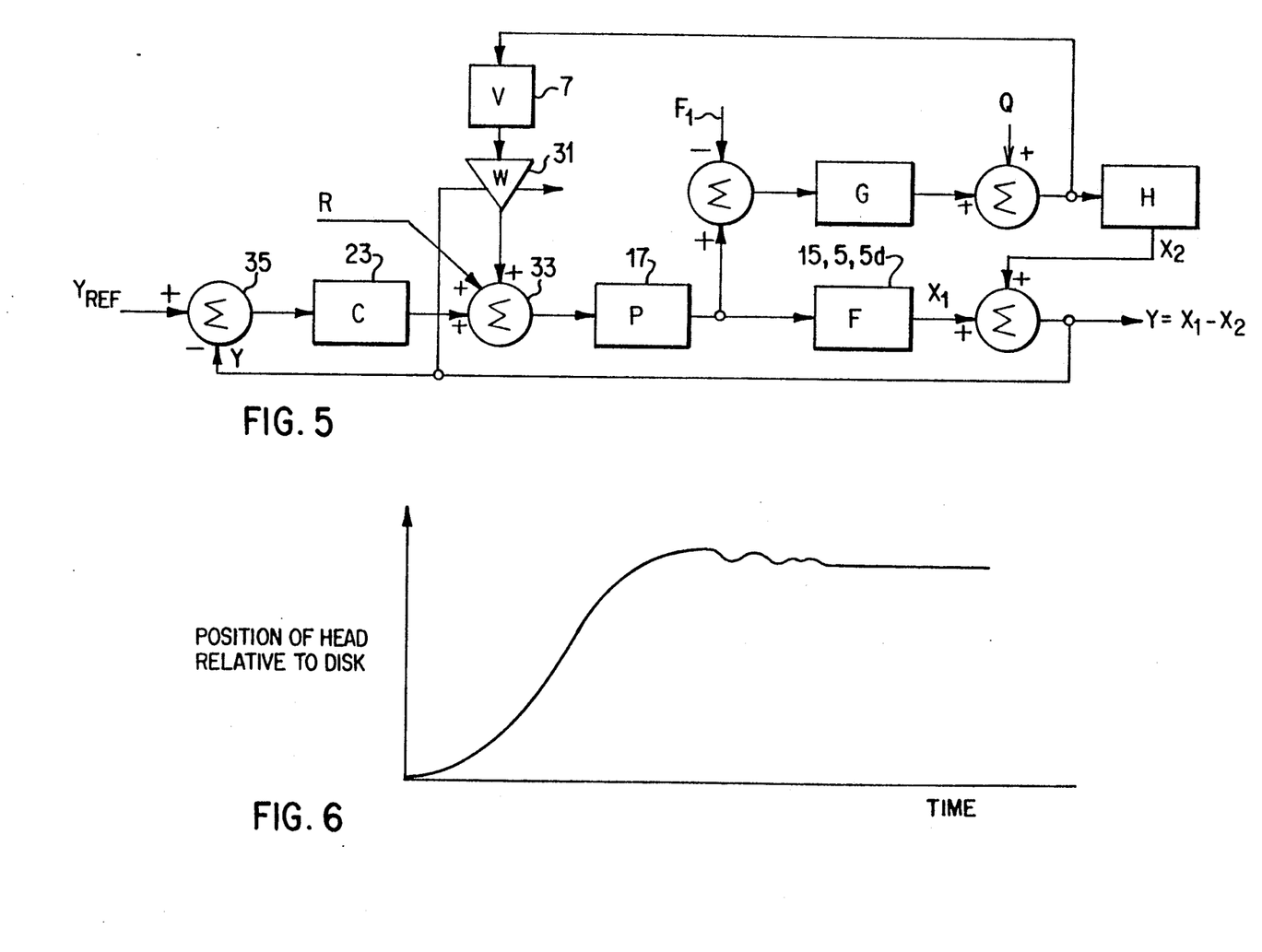
FIG. 5 is a model of a subcombination of the servo system of FIG. 4 depicting the organizational concept of the system for calibrating the shock attenuation function.
FIG. 6 is a graphic representation of the control function.

The invention will be better understood by reference to FIG. 5 which is a block diagram modeling system concept. In this illustration the accelerometer is again assumed to be mounted on the support or the base plate 1a as shown in FIGS. 1 and 2. In this system model, the block F represents the dynamics of the actuator structure which includes the actuator motor rotor. The input to the actuator structure is coil current and the output of the actuator structure is the actual position of the transducer. The actuator motor 15 is powered by the power amplifier 17, which for the purposes of this discussion also bears the reference character P. The primary servo loop is closed by differentially combining the head-to-disk position denoted Y with a desired position reference $Y_{REF}$ in the summing injunction 35 and passing the resultant position error signal through the compensator 23 in the servo feedback loop to the power amplifier 17.

The position error signal Y is shown to be formed by the subtraction of the disk position X2, which is treated as a rigid body with the base plate or support 1a, FIG. 1, from the head position, X1. Disk position is affected by the external acceleration disturbance Q, or by an internal reaction force, F1, of the actuator 5 on the base plate or support 1a when the coil 5f of the voice coil motor is energized. The internal reaction force, F1, models the slight movement which will occur in the base plate 1a in a direction opposite to that in which the transducer 5d moves. The force which moves the transducer is equal and opposite to the force which moves the base plate, but the base plate is much more massive and thus experiences much less acceleration. The fact that the actuator 5 can move the base plate 1a, albeit only slightly, is treated later in this disclosure when initial calibration is discussed.

The accelerometer 7 is mounted in a location where it can sense the acceleration of the base plate 1a to which the actuator structure is responsive and this acceleration signal is passed through the adjustable gain stage 31 and via the summing junction 33 into the power amplifier 17. The reference character V in the accelerometer block 7 represents the coupling of the external shock and vibration to the accelerometer 7 which is a function of the location and orientation of the shock force and the location and orientation of the accelerometer with respect to the base plate 1a or more generally the housing of the device 1.

In order to calibrate the gain W of the accelerometer in an environment where the external disturbance Q is normally non zero, as in the case where a compact disk player is being carried or worn while the listener is walking or jogging or in a manufacturing environment where a player or disk drive is intentionally shook, an iterative procedure can be followed which uses the error signal Y as a measure of the goodness of cancellation of the acceleration reaction, to evaluate the gain settings W of the variable gain amplifier W. For this procedure, G, the base plate acceleration resulting from force of the actuator on the base plate when the actuator is accelerated, can be assumed to be negligible. This allows treatment of the accelerometer path as a feed forward path only. From FIG. 5 it can be determined that when H=VWPF, a signal Q will have no effect on the head-to-disk position Y, because Q passes through two paths of equal gain which cancel (X1=X2) at the summing junction 39, where Y=X1-X2.

A gain W of the variable gain amplifier 31 can be adjusted to minimize the position error, Y, under the influence of a disturbance Q by trial and error (random search), by adjusting the gain W in a single direction as long as the position error Y improves, that is reduced, and stopping when the position error Y has reached a minimum (steepest descent), or by a more efficient method outlined below, which is based upon the well known LMS algorithm. This method will arrive at the optimal gains setting W, more quickly than the aforementioned approaches. The procedure for this adjustment goes as follows:

1. Measure the position error signal Y and the accelerometer output signal Z at the time k to get $Y_k$ and $Z_k$.

2. Filter $Z_k$ with $\Phi$, a simple model of the Y/Z system response to get $U_k$. Y/Z is the transfer function of the servo loop from the input of the power amplifier 17 to the position error signal Y. A first order model of Y/Z, representing an approximation of the position gain, would suffice and the filter operation would then simply consist of multiplication of $Z_k$ by this gain to obtain $U_k$.

3. Update the new accelerometer gain W:

$$W_{new} = W_{old} + \mu U_k Y_k$$

Where $\mu$ is a constant that controls the speed of optimization.

This new iterative procedure is repeated continuously or when the gain of the accelerometer is expected to need adjustment. If the latter approach is preferred, the iterative procedure can be terminated when the reduction of the position error Y is not improved with further iterations. This calibration can be done once at the factory and the value of W saved or permanently set at the factory or it can be done at each power up or continuously during operation.

In circumstances where a disturbance Q cannot be guaranteed to be nominally present, base plate motion can be induced by means of the actuator itself. This motion can then in turn be used to calibrate the accelerometer in a fashion similar to that just described. A method for inducing motion in the base plate, and then using that motion to calibrate the accelerometer is as follows:

1. The actuator is moved to another track center by applying nearly full acceleration current to the voice coil and then equal duration and equal but negative amplitude deceleration current to the actuator in the open loop mode (i.e., without feeding back the position error signal to the actuator). By adjusting the accelerate and decelerate current amplitudes, this open loop move can be tuned so that the head arrives at track center of the target track without the assistance of feed back.

2. When the move is complete the servo loop is again closed.

3. As the accelerate and decelerate forces are applied to the transducer, reactionary forces are applied to the base plate. The reaction to these forces continues for a short duration after the decelerate phase. This behavior is accounted for in the block bearing the reference character G as response of G dies away. The block G represents the base plate dynamics or support dynamics or the housing dynamics as the case may be. Thus for a short instance in time, there is no signal coming from the power amplifier 17, no reactionary force on the base plate 1a, and the drive or player behaves as if it is reacting to an external force much like the shock force Q as the base dynamics response G dies away. The motion of the base plate causes position error in the head to the extent that the gain of the accelerometer signal path is mis-tuned. FIG. 6 plots the position of the transducer relative to the disk, that is, the position error signal Y, plotted against time. Here the acceleration and deceleration portion of the curve, indicating a significant radial displacement of the transducer, terminates with the transducer in a new radial position centered on a new track. At this point, the small ripple in Y, as a function of time, depicts the settling of the transducer at the new track location and is an indication of the diminishing response of the base at the termination of the deceleration phase.

4. At this point the problem can be addressed as if there is a short duration external disturbance acting on the drive. The iterative method described earlier is applied until the drive motion ceases.

5. After returning to the starting location, another open loop move is executed and the process is repeated until reduction of the position error signal Y is no longer to be had.

While the discussion herein has been focused upon the application of the principles of this invention to a disk drive of the type illustrated in FIG. 1, that is, a rotary actuator type of disk drive, it is apparent that the principles herein can be applied to a linear actuator system of the type of FIG. 2, in which the actuator moves on a carriage in line with the motion of the head. Additionally, the principles of this invention are applicable in all types of disk players where a transducer associated with the disk is controlled by an actuator, which, as in a disk player, moves the transducer to track spiral tracks rather than concentric tracks. The head can be magnetic, magnetoresistive or optical. All that is necessary for this approach to work is that the transducer produce a signal indicative of the closeness of the transducer to track center, together with a means responsive to the position error signal of the transducer and to acceleration of the device calibrated as a function of the position error signal for controlling the position of the transducer by electrical command.

What is claimed is:

1. A disk recording/reproducing device, comprising:
   a) a disk rotatably mounted on said device, said disk having a surface containing recording tracks;
   b) means on said device for rotating the disk;
   c) a transducer;
   d) moveable actuator means on said device for supporting said transducer adjacent a surface of said disk and for moving said transducer to different radial locations with respect to said recording tracks;
   e) control means having an input circuit receiving the output of said transducer for controlling said moveable actuator means to maintain said transducer substantially centered on a recording track;
   f) accelerometer means on said device responsive to acceleration of said device for additionally controlling said moveable actuator means, and;
   g) means responsive to the output of said transducer in an off-track position for adjusting the gain of said accelerometer means.

2. The invention according to claim 1, in which:
   a) said accelerometer means comprises an accelerometer, and
   b) an amplifier connected to the output of said accelerometer, said amplifier having a variable gain circuit connected to receive the output of said transducer.

3. The invention according to claim 1, in which:
   a) said moveable actuator means comprises a rotary actuator, and
   b) said accelerometer means comprises a rotary accelerometer.

4. The invention according to claim 1, in which:
   a) said moveable actuator means comprises a linear actuator, and
   b) said accelerometer means comprises a linear accelerometer.

5. A memory storage and access device comprising
   a) a disk rotatably mounted on said device and having a surface for storing recordings in tracks;
   b) a motor power moveable arm on said device;
   c) a transducer mounted on said moveable arm;
   d) a control system for controlling said motor and arm to hold the transducer centered at a track on said surface;
   e) an accelerometer mounted on said device for sensing acceleration of said device due to impact forces coupled to said device for producing a feed forward control signal coupled to said control system to anticipate the effect of said impact force on said device under all the positions of said transducer and said track, for reducing the amount of positional change of the transducer relative to the center of said track;
   f) means for producing a transducer position error signal relative to the center of said track, and
   g) means responsive to the position error signal for optimizing the gain of said accelerometer.

6. The invention according to claim 5, in which:
   a) said means responsive to the position error signal comprises a variable gain amplifier in which the gain of the amplifier is controlled by said position error signal.

7. The invention according to claim 5, in which:
   a) said moveable arm is a rotary actuator.

8. The invention according to claim 5, in which:
   a) said moveable arm is a linear actuator.

9. The invention according to claim 5, in which:
   a) said device is a disk drive.

10. The invention according to claim 5, in which:
    a) said device is a disk player.

11. A method for controlling a position of a transducer with respect to the center of a track on a disk in a disk recording/reproduction device comprising;
    a) coupling track following forces to said transducer as a function of a position error of said transducer with respect to the center of said track;
    b) coupling displacement forces to said transducer as a function of the acceleration of said recording and/or reproduction device to aid in positioning said transducer at track center, and
    c) calibrating said displacement forces as a function of said position error.

12. In a memory storage and access device having a rotating member with a surface for storing data, a transducer on a moveable arm to be positioned at different radial locations on said rotating surface, means coupled to the transducer for providing a position error signal, a control system responsive to the position error signal for moving and positioning said moveable arm and an accelerometer for sensing acceleration of said device and coupled to said control system for additionally controlling the position of said moveable arm in response to acceleration of said device calibrated as a function of said position error signal, a method for calibrating said accelerometer, comprising:
    a) employing said position error signal to optimize accelerometer gain while said device is not subject to acceleration;
    b) subjecting said device to external shock or vibration, and
    c) optimizing accelerometer gain for minimal error while in a non-zero shock environment by employing said position error signal and letting the external shock or vibrating serve as an excitation to the system which comprises the rotating member, the transducer and moveable arm for which the position error is being reduced.

13. The method according to claim 12, further comprising:
    a) optimizing the gain of the accelerometer by employing a least mean square (LMS) procedure.

14. The method according to claim 12, further comprising:
    a) optimizing the gain of the accelerometer employing a random search algorithm.

15. The method according to claim 12, further comprising:
    a) optimizing the gain of the accelerometer employing a steepest descent algorithm.

16. The method according to claim 12, in which:
    a) said device is subject to shock by operating the moveable arm to induce motion of the device.

* * * * *